March 7, 1939.　　F. P. KRETCHMER　　2,149,920
EXTRUSION DEVICE
Filed Aug. 14, 1937
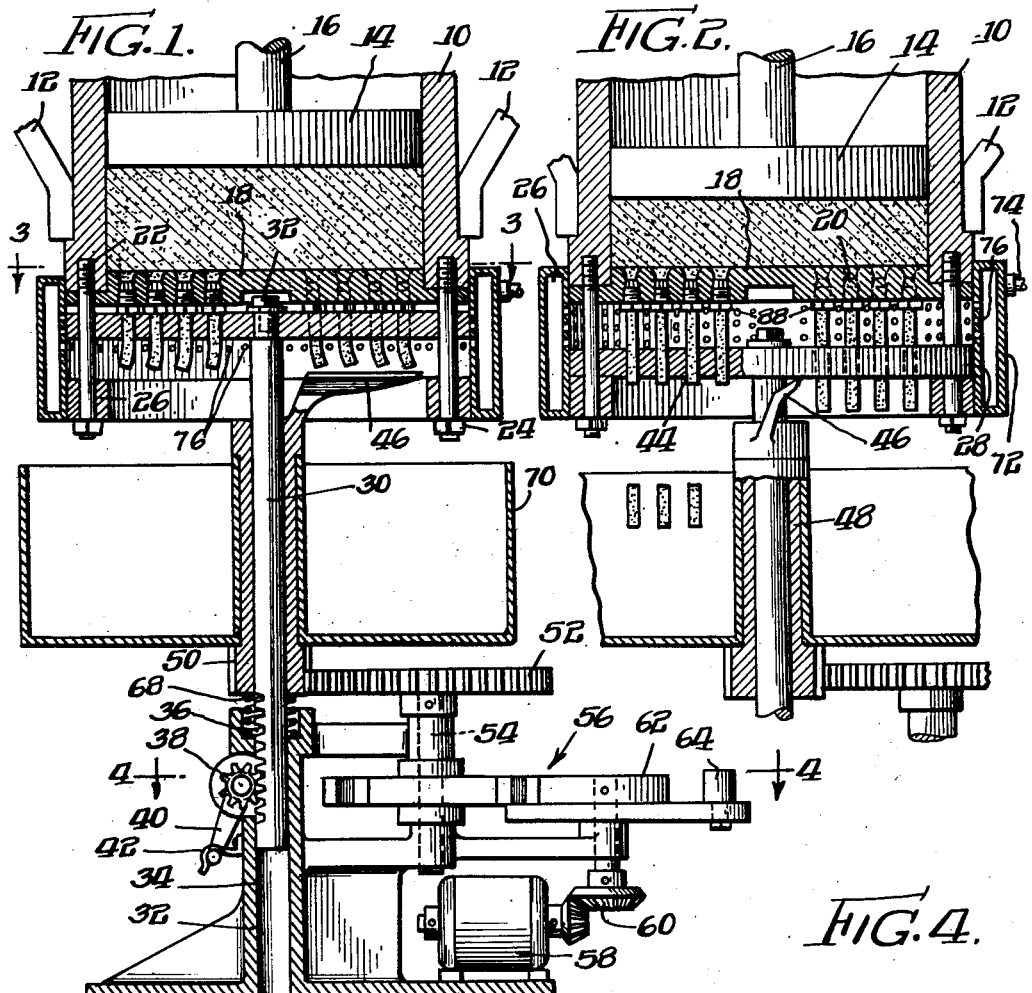
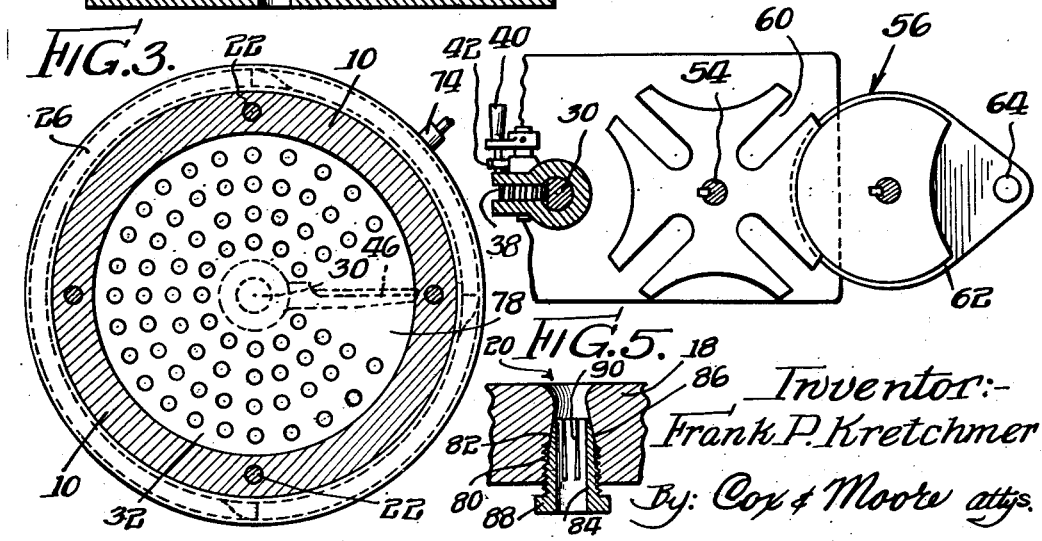
Inventor:-
Frank P. Kretchmer
By: Cox & Moore attys.

Patented Mar. 7, 1939

2,149,920

UNITED STATES PATENT OFFICE 2,149,920

EXTRUSION DEVICE

Frank P. Kretchmer, Chicago, Ill.

Application August 14, 1937, Serial No. 159,129

16 Claims. (Cl. 107—14)

The present invention relates to a machine for extruding relatively short lengths or sections of plastic material, such as lozenges or short, cylindrical pieces.

In the manufacture of foodstuffs, and candies in particular, it is often desirable to provide a solid extruded substance in uniform, relatively short lengths having a cylindrical or other similar preferred cross-section. While it is possible, when extruding quite elongated strands through a die as, for instance, in the making of spaghetti or licorice in long pieces, to procure straight, relatively uniform lengths, nevertheless the end portion of the strands first to pass through the die will invariably possess a curved or curled configuration. When it is desired to form short lengths only by extrusion through dies, the resulting product will consist almost entirely of pieces in the form of curls, spirals or other curvilinear, sinuous lengths.

It is an object of the present invention to provide a new and improved device for forming relatively short lengths of plastic material of generally uniform cross-section which are substantially free from longitudinal curves or distortions.

Further objects of the present invention are to provide improved means for continuously forming, by extrusion or passage through dies or the like, relatively short lozenges, cylinders or other suitable sections which are straight throughout their length and of uniform appearance; to provide novel means for extruding plastic material through dies in combination with cutting means for severing or slicing off short lengths as they are formed by the machine to provide a product of uniform shape and size; and to provide novel means for maintaining the extruded product of a die straight and undeviating in configuration.

Numerous other objects and advantages will more fully appear during the course and progress of the following specification.

Referring to the drawing:

Fig. 1 is a sectional elevation taken across the central portion of a machine constructed in accordance with the present invention.

Fig. 2 is a partial sectional elevation taken on the same line as Fig. 1, but showing the movable die plate in its lower position.

Fig. 3 is a sectional plan view taken on the line 3—3 in Fig. 1.

Fig. 4 is a sectional plan view taken on the line 4—4 in Fig. 1.

Fig. 5 is a sectional detail elevation taken transversely through one of the extrusion orifices in the upper die-plate.

The machine, shown in the drawing for purposes of illustrating the present invention, comprises an upper container 10 into which is charged the mass of plastic material to be extruded through the dies. In the present embodiment, the vessel 10 is cylindrical in configuration but it will be obvious that it may be made with any suitable cross-section. The container or vessel 10 is supported from any suitable frame (not shown) by brackets 12 welded thereto and interiorly is provided with a piston 14 which may be actuated by suitable force-creating means, such as a hydraulic press, through the agency of the piston rod 16 to extrude the contents of the container.

The lower end of the container 10 is closed by means of the upper die plate 18 which is provided with a plurality of dies or extrusion orifices 20, which will be hereinafter described in greater detail, of proper size and shape to produce lozenges or extruded lengths having the desired cross-sectional form. It will be noted that the die apertures are spaced uniformly over the area of the die plate 18 with the exception of one radial portion and the purpose of this construction will be described more in detail hereinafter.

Stud bolts 22 assist in securing the upper die plate 18 to the lower edge of the cylindrical container 10 and at their lower ends, through the agency of the nuts 24, rigidly support the annular ring member 26. A lower movable die plate 28 is mounted for vertical slidable movement upon the central portion of the studs 22 between the upper die plate 18 and the annular ring or collar 26 and is secured to the end of the shaft 30 by means of the cap screw 32. The shaft 30 is in turn supported in vertical position against rotational movement by the base member 32 adapted to be placed on any suitable foundation and provided with a standard having a bore 34 in which the shaft 30 is accommodated.

A series of teeth 36 formed on the side of the shaft 30, as viewed in Fig. 1, provide a rack which is in continual engagement with the pinion 38 mounted rotatably in the base connected with the control handle 40 which may be locked under the spring catch 42 when the shaft and lower die plate are in their upper position, as indicated in Fig. 1. There is thus provided means for selectively raising or lowering the movable die plate 18 with relation to the fixed die plate. It is to be noted that the lower die plate 28 is provided with a series of apertures 44 which are identical in number with the apertures or orifices in the superimposed die plate and are very carefully aligned therewith. Moreover, for reasons which will hereinafter appear, the lower apertures 44 are of slightly increased diameter to permit ready passage of the extruded sections.

Motor driven means is provided to continually sever uniform short sections of extruded material of the desired length and comprises preferably a knife 46 secured rigidly to the sleeve 48 which is mounted for rotation about the shaft 30. Gear teeth 50 at the lower end of the sleeve provide a pinion in engagement with the gear 52 mounted upon the rotatably supported shaft 54 and driven intermittently through the Geneva mechanism 56 which is in turn actuated continuously by the electric motor 58 and the beveled gears 60. More specifically, the Geneva mechanism comprises the rotating member 62 having a driving pin 64 thereon adapted to engage in the slots 66 in the driven member and intermittently rotate the latter member through a quarter revolution for each complete revolution of the driving member 62.

Each time the driven member of the Geneva mechanism is actuated, the gear 52, being attached to a common shaft, will be rotated through an equal arc, driving the gear 50 and accordingly the knife 46 through a complete revolution in order to sever any protruding material.

The knife 46 is normally maintained against the lower surface of the die plate 28 by means of the spring 68 bearing against the lower surface of the sleeve 48 and serving to resiliently force the sleeve and the knife in an upward direction. A suitable annular bin or container 70 is mounted upon the sleeve 48 and may either rotate therewith or may be affixed as, for example, to some convenient support or frame so that the sleeve 48 will rotate with respect thereto.

Additional means is provided to dust the extruded substance, particularly in the case of candies or foodstuffs, with a suitable powder, such as starch, and comprises generally an annular chamber 72 mounted exteriorly of the die plates and the annular ring 26 and is secured to this latter member and to the container 10 by welding. The conduit 74 leading into the chamber 72 may connect with any suitable source of air under pressure containing a proportion of starch which will be distributed through the space between the die plates by means of the apertures 76. Suitable baffles (not shown) may be provided in the chamber to properly distribute the flow of starch-containing air uniformly throughout the said space.

It is desired, according to the preferred embodiment of the present invention, that the severed, extruded lengths of material be uniform in length and appearance, and it is therefore a purpose of the present invention to regulate the rate of extrusion through the various orifices so that the knife 46 will act to sever pieces of substantially the same length. Moreover, it has been found that where a plurality of extrusion orifices 20 are supplied with plastic material from a common source, that the rates of extrusion are not always the same, particularly where certain portions of the die-plate are provided with a greater number of apertures for a given area, than some other portion thereof.

In the present device the apertures in the die plates are spaced relatively uniformly thereover, with the exception of the radial portion 78, hereinbefore mentioned, and clearly shown in Fig. 3, and provided adjacent the normal resting position of the knife at times when it is not being actuated to sever the extruded material.

In the operation of the present device apparently the excess of plastic material in the vicinity of the portion 78 which does not find as ready egress, is forced toward the adjacent apertures, with the result that if the die apertures were all bored with the same diameter there would be a tendency for the material to extrude much more rapidly adjacent these points. Accordingly, the present invention provides control means for the apertures in the upper die plate, this means being shown more clearly in Fig. 5.

The aperture 20 is beveled at its entrance to permit ready passage of the plastic material. Toward the lower portion the aperture is of increased diameter and is provided with threads 80. Just above the threaded portion there is situated a conical beveled surface 82 which narrows in an upward direction. Situated interiorly of this aperture and supported by the threaded portion 80 is a split sleeve 84 having a central bore coaxial with the die aperture 20 and the plate 18. The upper end of the split sleeve is tapered to a conical form at 86 in order to co-act with the tapered portion 82 to control the effective diameter of the bore 84. The sleeve is also provided with a hexagonal head 88 to permit engagement of any suitable wrench for adjustment thereof.

In the embodiment shown the sleeve is provided with six longitudinally extending slits 90, although it will be apparent that this number is in no way critical and may be varied considerably in accordance with the shape of the product desired.

In order to control the rate of extrusion through the orifice it is only necessary to rotate the split sleeve by means of a suitable wrench to adjust it upwardly or downwardly, whereupon the inclined end portion 86, riding into or out of the tapered portion 82 of the aperture in the plate 18, will tend to either cause expansion or contraction of the upper end of the sleeve, permitting fine adjustment of the orifice. When the rate of flow through an orifice is relatively great, adjustment of the control sleeve in an upward direction will tend to constrict the flow therethrough.

In operation, the chamber 10 is first loaded with a batch of suitable plastic material. For purposes of illustration, it will be assumed that the substance extruded is a licorice candy mix. At this time the lower die plate will be in the upper position, as shown in Fig. 1. Pressure is thereupon applied to the piston 14 to drive the mass of licorice through the dies 20 and 44. Any extruded portions which extend therefrom will have the curved or curled configuration, as indicated in Fig. 1. As the material commences to flow from the lower apertures 44, however, the handle 40 is actuated to lower the shaft 30 and accordingly the entire lower die plate 48 to the position indicated in Fig. 2, at which time the extruded material will pass from the first die plate to the second die plate in a perfectly straight line, as indicated by the figures. Meanwhile the knife 46, which normally occupies a position opposite a portion of the die plates which is devoid of die apertures, as shown in Fig. 3, is energized by the rotation of the motor 58 through the medium of the Geneva mechanism and gear means and, when the extruded portions of licorice have reached a predetermined length, makes a single complete rotation, permitting the severed pieces to drop into the bin 70, as shown in Fig. 2.

Since the cutting step takes place intermittently in carefully timed relationship, the lozenges produced will be all of substantially the same length and appearance, the die plates remaining in the stated position as long as the mass of licorice is fed under a uniform pressure from the container 10.

During operation of the machine, it is preferred that the draft of air laden with starch or similar powdered material be introduced into the space between the two die plates through the conduit 74, the casing 72 and the apertures 76. The slight pressure or draft maintained in this space causes the excess starch-laden air to pass out through the apertures 44 about the surface of the extruded pieces, thereby not only assuring that uniform and proper coating will take place, but also serving to carry an adequate quantity of starch or powder through the vicinity of the cutting blade 46 to maintain the latter in clean condition and prevent sticking or adherence. The product produced by the above described machine will have the shape generally indicated in Fig. 5.

The present invention provides a machine in which great quantities of short sections of extruded material may be continuously manufactured in perfectly straight and uniform capsules or rods. According to the present invention the movable die plate serves to maintain the extruded product free from sinuous configurations that characterize ordinary short extruded lengths.

It will be apparent from the present disclosure that the die apertures 44 are preferably larger than the die apertures 20 so that there will not be created any considerable drag upon the material tending to cause buckling of the extruded portions between the two plates. It has been found in accordance with the present invention that the tendency for the intermediate portions to buckle is increased when the distance separating the fixed and movable die plates becomes very large. Accordingly the degree of separation and the size of the apertures 44 will be suitable to produce a substantially straight product.

The present invention is particularly adaptable in the manufacture of candies that are "short-cooked;" for example, a licorice mix containing a relatively small proportion of molasses and having been treated under a relatively shorter period of cooking insufficient to produce a hard and gummy mass.

The character of the press employed to actuate the piston 14 will permit the use of plastic material which is either extremely viscous, or relatively fluid as the case may be, while the continual dusting operation carried on will serve to permit collection of the lozenges in the bin for subsequent drying or treatment without danger of sticking or adherence.

It is thought that the invention and numerous of its attendant advantages will be understood from the foregoing description and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. In an extrustion device, a die, and a second die spaced axially therefrom to guide the extruded product of said first named die, said second die being in substantial alignment with said first named die throughout and having a slightly increased transverse dimension.

2. In an extrusion device, a die, means for forcing a plastic material through said die from one side thereof to provide an extruded section of plastic material, and an apertured plate spaced from the said die on the other side of said die to guide the section of material extruded thereby, the aperture in said plate being in alignment with the die aperture and having its edges engaging the material extruded from the die aperture for aligning the extruded section.

3. In an extrusion device, a die, means for forcing a plastic material through said die from one side thereof to provide an extruded section of plastic material, and a second die axially aligned throughout its length with said first named die and spaced therefrom.

4. In an extrusion device, a die, means for forcing a plastic material through said die from one side thereof to provide an extruded section of plastic material, and an apertured plate on the other side of said die to guide the section of material extruded thereby, said apertured plate being movable toward and away from said die.

5. In an extrusion device, a die, means for forcing a plastic material through said die from one side thereof to provide an extruded section of plastic material, an apertured plate on the other side of said die having an aperture aligned with the die aperture to guide the section of material extruded thereby, and means associated with said apertured plate to cut the extruded section into substantially uniform lengths, said apertured plate being adjustable from a position in substantially contiguous juxtaposition with respect to the die to a position substantially spaced therefrom.

6. In an extrusion device, a die split transversely into two sections, and means to separate said sections along an axial line to a substantially spaced position.

7. In an extrusion device, a die split transversely into two sections, means to separate said sections along an axial line to a substantially spaced position, and means for forcing a plastic material through said die during said separation to produce a substantially straight extruded section.

8. In an extrusion device, a die split transversely into two sections and residing in substantially contiguous, juxtaposed position, means to separate said sections along an axial line to a substantially spaced position, means for forcing a plastic material through said die during said separation to produce a substantially straight extruded section, and cutting means operable transversely adjacent said die to cut the extruded section into pieces of substantially uniform length.

9. An extrusion device for forming relatively short lengths or lozenges of plastic material, such as macaroni, licorice and the like, comprising a die plate, means to force the said plastic material through said die plate to form extruded sections thereof, a second die plate spaced from said first named die plate and having apertures therein and being adjustably movable to juxtaposition with respect to said first named plate, means to cause the extruded sections from said first named die plate to pass through the apertures in said second named die plate, and cutting means operable transversely adjacent the said second plate to cut the extruded sections into uniform lengths.

10. An extrusion device for forming relatively short lengths or lozenges of plastic material, such as macaroni, licorice and the like, comprising an upper die plate, means to force the said plastic material through said die plate to form extruded sections thereof, a second die plate arranged below said first named die plate and spaced therefrom and having apertures therein, means to cause the extruded sections from said first named die plate to pass through the apertures in said second named die plate in contact with the edges thereof, said plate being spaced at all points and said space between the plates being substantially free of any guiding means for the extruded sections, and cutting means operable transversely adjacent the said second plate to cut the extruded sections into uniform lengths.

11. An extrusion device for forming relatively short lengths or lozenges of plastic material, such as macaroni, licorice and the like, comprising an upper die plate, means to force the said plastic material through said die plate to form extruded sections thereof, a second die plate arranged below said first named die plate in a generally parallel plane and spaced from said first named die plate and having apertures aligned with the apertures in said first named die plate, means to cause the extruded sections from said first named die plate to pass through the apertures in said second named die plate, said plates being spaced at all points and said space between the plates being substantially free of any guiding means for the extruded sections, cutting means arranged adjacent the lower side of said second named plate, and means to intermittently actuate the cutting means when the extrusion has progressed to a desired degree to cut the extruded sections into parts of uniform length.

12. An extrusion device for forming relatively short lengths of plastic material, such as macaroni, licorice and the like, comprising a die plate, means for continuously forcing the said plastic material through said die plate to form extruded sections thereof, a second die plate spaced from said first named die plate in a generally parallel plane and having substantially axially aligned apertures of larger dimension than the apertures in said first named die plate, means to cause the extruded sections from said first named die plate to pass directly through the apertures in said second named die plate, said second die plate being adjustable bodily from said spaced position to substantially contiguous position, and cutting means intermittently operable adjacent the outer surface of said second named plate to transversely cut the sections into uniform lengths.

13. An extrusion device for forming relatively short lengths or lozenges of plastic material, such as macaroni, licorice and the like, comprising a die plate, means to force the said plastic material through said die plate to form extruded sections thereof, a second die plate spaced from said first named die plate and having aligned apertures of larger dimension than the apertures in said first named die plate, means to cause the extruded sections from said first named die plate to pass through the apertures in said second named die plate, cutting means operable transversely adjacent the said second plate to cut the extruded sections into uniform lengths, and means to introduce a dusting powder between said plates whereby to produce a coating on the product.

14. In an extrusion device, a die plate having a plurality of die apertures therein, and means to adjust the effective diameter of said apertures whereby to uniformly control the relative lengths of the extruded sections.

15. In an extrusion device, a die plate, a plurality of die apertures formed in said plate, said die apertures being non-uniformly arranged, means to force a body of plastic material on one side of said die plate through said apertures to produce a plurality of extruded sections, and means to independently adjust the effective diameter of said apertures to uniformly control the rate of extrusion of the said plastic material.

16. In an extrusion device, a die plate having a plurality of die apertures therein, adjusting means comprising expansible die sleeves arranged in said plate and having apertures therein for extrusion of the plastic material, and means to adjust the sleeves to independently control the effective diameter of said apertures.

FRANK P. KRETCHMER.